Sept. 27, 1927.

H. A. STONE 1,643,527

AQUARIUM

Filed May 3, 1926 2 Sheets-Sheet 1

Inventor:
Herbert A. Stone,
By J. Daniel Stuwe
Attorney.

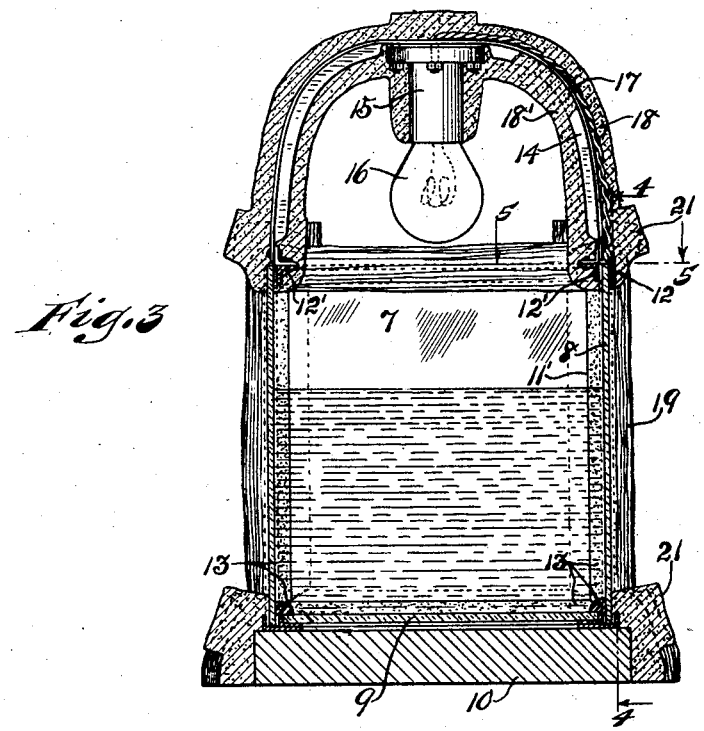
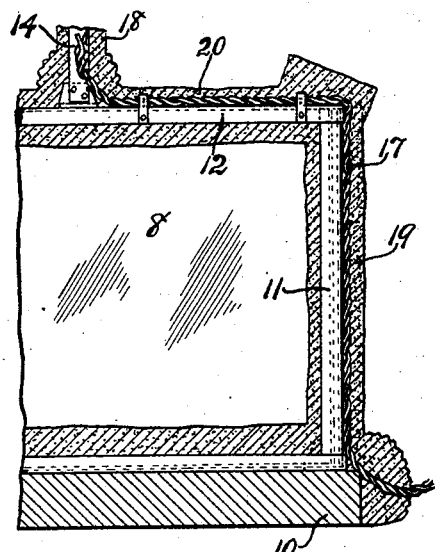
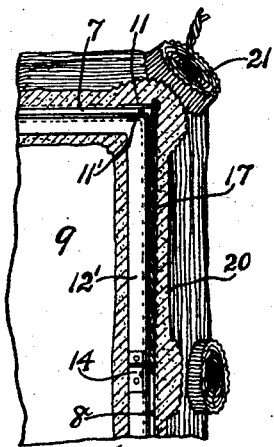

Patented Sept. 27, 1927.

1,643,527

UNITED STATES PATENT OFFICE.

HERBERT A. STONE, OF CHICAGO, ILLINOIS.

AQUARIUM.

Application filed May 3, 1926. Serial No. 106,363.

My invention relates to aquariums, and more particularly to aquariums with lighting fixtures thereon; and one of the objects of the invention is to provide an aquarium with an overhead lighting fixture. Another object is to provide an aquarium with an arch, and a lighting fixture mounted on said arch to provide an overhead light for the aquarium. A further object is to provide an aquarium having an electric lighting fixture with a conductor leading therefrom, and the aquarium having means for housing and concealing the conductor. Another object is to provide an aquarium with an arch and an electric lighting fixture on said arch, and a conductor leading from said lighting fixture along said arch and being entirely concealed by the structure of the arch. Another object is to provide an aquarium including a container or body with an arch thereon, and a lighting fixture on said arch with a conductor extending therefrom along said arch and along said body, there being means on said arch and body for entirely concealing said conductor. And another object is to provide an aquarium having its frame and the exterior thereof arranged to provide a rustic aquarium. And a further object is to provide an aquarium including a frame structure with an arch and a lighting fixture thereon, and providing means on said frame and arch to entirely conceal the conductor leading from said lighting fixture and at the same time provide a rustic appearance of the aquarium.

Other objects and advantageous ends are accomplished with my invention, as will become apparent from the following description, taken in connection with the accompanying drawings, in which, Fig. 1 is a plan view of the preferred form of construction embodying my invention;

Fig. 3 is a vertical cross section thereof;

Fig. 4 is a partial vertical longitudinal section, taken on line 4—4 of Fig. 3; and Fig. 5 is a partial horizontal section, taken on line 5—5 of Fig. 3.

Figure 1:
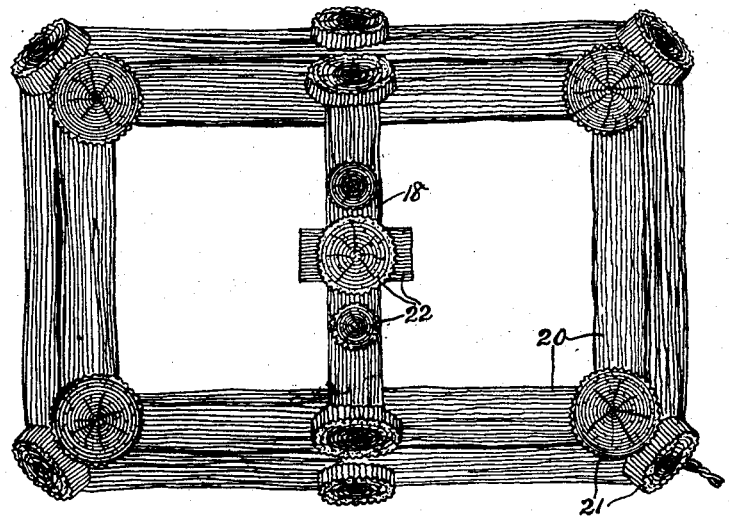
Figure 2:
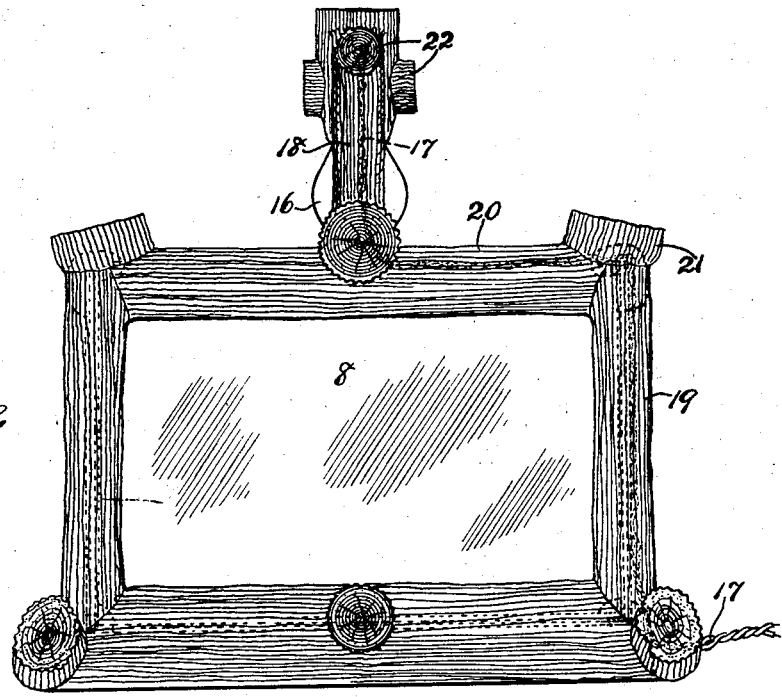
Fig. 2 is a side elevation thereof.

In the drawings I have illustrated a certain form of construction embodying my invention, and this form preferably comprises a container with transparent wall members or plates preferably including end members 7, side members 8, and a bottom member 9, all supported on a base 10.

Around these transparent wall members I preferably mount frame means which may include members 11 and 11' of metal or other durable material placed at the vertical joining edges of said wall members, and similar members 12 and 12' placed at the top edges thereof. Said metallic members are connected in a suitable manner to produce a durable structure providing the container, while sealing means 13 is placed on the inside of the joining edges of the wall members to produce a tight container for retaining the water therein.

I provide an arch over the container and especially over the frame means thereof, which arch preferably includes a metallic arch member 14 mounted with its lower ends on the metallic members 12' and being arranged at its top to provide a lighting fixture, which I preferably do by providing a socket member 15 for supporting an electric light bulb or lamp 16, or in a similar manner, so as to provide an overhead lighting fixture for illuminating the aquarium from above. An electric conductor 17 extends from the socket along the arch member 14 and along the frame members 12 and 11 to the base 10.

I further construct my aquarium so that the conductor 17 is entirely housed and concealed for its entire distance from the lighting fixture down to where it extends from the base or bottom of the structure. This I preferably do by providing covering means which is placed over the arch member 14, as shown at 18, 18', and over the metallic members 11, 11', as shown at 19, and over members 12 and 12' as shown at 20, thereby covering and concealing the conductor, and at the same time completing the arch and frame means or structure of the aquarium. For this covering means I preferably use a cementitious substance, or any suitable substance which I apply in the plastic condition and mold or form it on the frame members, over the conductor to cover the same. I arrange the construction of the arch and frame means so that a space is provided in the structure for housing and concealing the conductor therein, and I also arrange the covering means so as to form a roughened exterior and preferably having knots or stub branches 21 on the frame part, and similar knots or stub branches 22 on the arch, substantially as shown in the drawings, thus giving the structure a rustic appearance and providing a rustic aquarium, with an overhead lighting fixture and a conductor extending therefrom and being entirely concealed in the structure of the arch and container.

What I claim as my invention and desire to secure by Letters Patent is:

1. An aquarium comprising wall members, means at the edges of said members and connecting said members, an arch including a rigid member mounted on said connecting means, a lighting fixture on said rigid arch member, an electric conductor leading from said lighting fixture along said arch member and said connecting means, and covering means placed over said rigid arch member and over said connecting means and entirely housing and concealing said conductor.

2. An aquarium having walls, an arch including a member extending from said walls, a lighting fixture on said arch, an electric conductor extending from said lighting fixture along said arch, and covering means placed over said arch member and over said wall means to conceal said electric conductor.

In testimony whereof I have signed my name to this specification.

HERBERT A. STONE.